Patented Aug. 30, 1938

2,128,307

UNITED STATES PATENT OFFICE 2,128,307

MANUFACTURE OF AMINO DERIVATIVES OF ANTHRAQUINONE

Geoffrey Lord and George Reeves, Spondon, near Derby, England, assignors to Celanese Corporation of America, a corporation of Delaware No Drawing. Application June 27, 1936, Serial No. 87,695
In Great Britain July 25, 1935

22 Claims. (Cl. 260—382)

This invention relates to the manufacture of amino or aliphatically substituted amino derivatives of anthraquinone and related compounds.

A very important method for the manufacture of amino or aliphatically substituted amino derivatives of anthraquinone, particularly $\alpha$-derivatives, is the replacement by an amino group or aliphatically substituted amino group of a hydroxy group or groups in a corresponding hydroxy anthraquinone derivative. For example 1-hydroxy-4-methylamino-anthraquinone and 1:4-di-(methylamino)-anthraquinone advantageously can be manufactured from quinizarin (1:4-dihydroxy-anthraquinone) and methylamine.

Generally, however, no useful result can be obtained by merely heating the quinizarin with the methylamine. Good results have only been obtained by first reducing the quinizarin to a leuco compound (or alternatively using the quinizarin in conjunction with a reducing agent). The initial amidated product is a leuco derivative of the desired methylamino-anthraquinone and a further operation is required to convert it into the desired methylamino-anthraquinone. These operations of preparing leuco quinizarin and of converting the leuco amidated product involve considerable expense.

Similarly, when effecting the replacement of an amino group or groups of 1:4-diamino-anthraquinone or other amino-anthraquinone by an aliphatically substituted amino group with the aid of an aliphatic amine, useful results have only been obtained by employing the amino anthraquinone compound in the form of a leuco compound or by effecting the reaction in the presence of a reducing agent. These latter processes likewise involve conversion of the leuco compound which constitutes the initial reaction product.

We have now found a new method whereby, with the aid of ammonia or an aliphatic amine, an $\alpha$-hydroxy group in an anthraquinone nucleus of a compound containing an anthraquinone nucleus may be replaced by an amino group or aliphatically substituted amino group, or an $\alpha$-amino group in such an anthraquinone compound may be replaced by an aliphatically substituted amino group, or an $\alpha$-(substituted amino) group in such an anthraquinone compound may be replaced by an aliphatically substituted amino group differing therefrom. By the term "anthraquine nucleus" we mean an anthraquinone nucleus having the quinone structure characteristic of anthraquinone in the unreduced state.

In our new process the desired replacement is effected by the action of the ammonia or aliphatic amine directly and without first reducing the anthraquinone compound or employing a reducing agent. Moreover, the desired amino compound is obtained as such and not in the form of a leuco compound requiring further treatment. We have found that the desired direct reaction without necessity for reduction may be effected by means of metals other than alkali metals, and especially by heavy metals. Metals which are particularly advantageous are those capable of forming ammines or like complex or co-ordination compounds containing nitrogen, especially compounds derived from ammonia or organically substituted ammonias and which are salts or bases and can ionize, yielding on the one hand an acidic ion or hydroxyl ion as the case may be, and on the other hand a complex ion containing both metal and nitrogen.

The tendency to form such ammine or like co-ordination or complex nitrogen-containing compounds is very marked in the case of metals of Group VIII of the periodic system. This tendency is exhibited, though to a rather less extent, by metals of the neighbouring Groups VII and IB. Thus cobalt, nickel, the palladium metals, and the platinum metals all yield comparatively stable metal ammine compounds, and manganese in Group VII and copper, silver and gold in Group IB yield somewhat similar compounds, though in general of rather lower stability. The tendency is exhibited even by metals of other groups of the periodic system, particularly the metals of Group IIB and VIA and to some extent by thallium in Group III, tin and lead in Group IV, and vanadium in Group V. Iron exhibits comparatively little tendency to form such compounds.

Manganese and copper have been found especially valuable for the purposes of the present invention. These metals yield ammine compounds which are characterized by a rather lower stability than the characteristic ammine compounds of cobalt or of platinum. Other metals yielding ammine compounds of similar properties, for example, nickel, are likewise very useful for our purpose. As specific examples of other metals which may be employed reference may be made to silver of Group I, magnesium, zinc, cadmium and mercury of Group II, thallium of Group III, lead and tin of Group IV, vanadium and bismuth of Group V, and iron, cobalt and platinum of Group VIII.

The metals are preferably supplied in a form in which they are capable of reacting with ammonia or an amine to yield an ammine or like complex nitrogen-containing compound. For instance, the metals may be supplied in the form of their salts, as in the case of maganese sulphate, copper sulphate or platinic chloride. Again, they may be supplied in the form of oxides or hydroxides.

To obtain the new result it is sufficient to add a salt of one of the metals in question to the mixture of anthraquinone compound and ammonia or amine which is required to undergo reaction. The proportion of metal employed may be quite small. For example in the case of causing quinizarin to react with ammonia and methylamine or other aliphatic amine, rapid reaction can be secured by addition of about 1% of manganese sulphate calculated on the weight of the quinizarin. For instance, by heating quinizarin with methylamine in alcohol at about 140° C. with addition of 1% of manganese sulphate on the weight of the quinizarin, rapid reaction takes place with production of 1-hydroxy-4-methylamino-anthraquinone or 1:4-di-(methylamino)-anthraquinone, according to the quantity of methylamine present. Smaller quantities of metal compound may be employed, though the rate of the reaction may thereby be substantially decreased. The proportion may be from 0.1% to 5%, e. g. 0.5 to 2%, on the weight of the anthraquinone compound. If desired an inorganic alkali such as an alkali metal carbonate or hydroxide may be added to the reaction mixture. For example when the manganese or other metal is supplied in the form of a salt a quantity of inorganic alkali approximately equivalent to the acid radical content of the salt may be used. Greater quantities may be used if desired.

Instead of mixing a metal salt or metal hydroxide with the anthraquinone compound and the ammonia or amine, a metal amine or like complex compound may be first formed with the ammonia or amine to be employed. Again, the metal may be first combined with the anthraquinone compound and the resulting metal compound allowed to react with the ammonia or amine.

The process of the invention is of especially great value for effecting the replacement of hydroxy, amino, or substituted amino groups in anthraquinones having in the 1- and 4-positions:

(a) two hydroxyl groups; or
(b) one hydroxyl group and one amino group or aliphatically or aromatically substituted amino group; or
(c) two amino groups; or
(d) one amino group and one aliphatically or aromatically substituted amino group; or
(e) two substituted amino groups.

As specific examples of anthraquinone compounds susceptible of reaction in accordance with the invention reference may be made to quinizarin, referred to above, 1,4,5-trihydroxy anthraquinone, 1,4,5,8-tetrahydroxy anthraquinone, 1-amino-4,5,8-trihydroxy anthraquinone, 1,4-diamino anthraquinone, 1,5-diamino-4,8-dihydroxy anthraquinone, 1,8-diamino-4,5-dihydroxy anthraquinone, 1-hydroxy-4-amino anthraquinone, 1-hydroxy-4-methylamino anthraquinone, 1-hydroxy-4-phenylamino anthraquinone. It is a feature of our new process that the parent anthraquinone compound is employed as such and not as a reduction product in which the characteristic keto groups of the anthraquinone nucleus have been reduced.

In carrying out the new process various aliphatic mono-, di- or poly-amines may be employed, or, instead of the amines themselves substances which yield them under the reaction conditions. By the term aliphatic amine we mean an amine containing an amino group not directly united with an aryl residue. Similarly, by the term "aliphatically substituted amino groups" we mean substituted amino groups in which the substituents are wholly aliphatic in character or are such that if aryl residues are present therein carbon of the aryl residues is not directly attached to the amino groups. As examples of suitable amines mention may be made of the following:—

(a) Alkylamines, e. g. monomethylamine or monoethylamine.
(b) Polyamines, e. g. ethylene diamine, $\alpha$-$\beta$-diamino-propane, $\alpha$-$\gamma$-diamino-propane, unsymmetrical diethyl-ethylene diamine.
(c) Substituted alkylamines, e. g. hydroxy alkyl-amines, for example $\beta$-hydroxy-ethylamine or $\beta$-$\gamma$-dihydroxy-propylamine.
(d) Hydro-aromatic amines, e. g. cyclohexylamine and nuclear methyl or other alkyl cyclohexylamines.
(e) Aralkylamines, including both aralkylamines free from substituents in the aromatic nucleus and aralkylamines substituted in the aromatic nucleus, for example benzylamine and parasulphobenzylamine.

Amines containing up to 7 or 8 carbon atoms are of special interest in that with their aid it is possible to produce compounds of great value as colouring matters for cellulose acetate.

The reaction between the anthraquinone or like derivative and the ammonia, or amine of aliphatic character or substance yielding the same, in the presence of the metal is advantageously effected in a liquid capable of dissolving part or the whole of the reactants under the reaction conditions. Alcohol is a very suitable liquid to employ in the case of condensing with ammonia or alkylamines or substituted alkylamines. If desired the reaction may be effected in the presence of boric acid, especially if an aqueous liquid diluent is used.

As examples of specific compounds which may be prepared in accordance with the invention we may mention 1-hydroxy-4-methylamino anthraquinone and 1,4-di-(methylamino)-anthraquinone (from quinizarin and monomethylamine); 1-amino-4-hydroxy-anthraquinone or 1,4-diamino-anthraquinone (from quinizarin and ammonia); 1,4-diethanolamino-5-hydroxy anthraquinone (from 1,4,5-trihydroxy anthraquinone and monoethanolamine), and 1,4-diethanolamino-5,8-dihydroxy anthraquinone (from 1,4,5,8-tethrahydroxy anthraquinone or 1-amino-4,5,8-trihydroxy anthraquinone and mono-ethanolamine).

The invention is illustrated but not limited by the following examples, the proportions being given in parts by weight:—

*Example 1*

An autoclave fitted with an agitator is charged with

| | Parts |
|---|---|
| Quinizarin | 60 |
| Alcohol | 650 |
| Sodium carbonate | 1 |
| Manganese sulphate | 0.5 |
| 25% aqueous solution of monomethylamine | 37.2 |

The autoclave is sealed, the temperature raised to 120° C. and kept thereat for four hours, after which the autoclave is allowed to cool. Its contents are blown out to a filter, sucked well, rinsed first with 50 parts of cold alcohol and then with water, and finally dried. The product is 1-methylamino-4-hydroxy-anthraquinone in good yield.

*Example 2*

An autoclave fitted with an agitator is charged with

|  | Parts |
|---|---|
| Quinizarin | 80 |
| Alcohol | 675 |
| 25% aqueous solution of monomethylamine | 104 |
| Sodium carbonate | 1 |
| Copper sulphate (in the form of a well ground powder) | 1 |

The machine is sealed, heated to 140° C. and kept thereat for ten hours, after which it is allowed to cool and its contents filtered, and washed on the filter with 150 parts of alcohol. The filter cake is then pasted with a solution of 70 parts sodium hydroxide in 1500 parts of water, boiled for 5 minutes, filtered, and rinsed with hot water. The product is 1,4-di-(methylamino)-anthraquinone in good yield.

*Example 3*

An autoclave is charged with

|  | Parts |
|---|---|
| 1,4,5-trihydroxy anthraquinone | 85 |
| Alcohol | 720 |
| Monoethanolamine | 61 |
| Sodium carbonate | 1 |
| Manganese chloride | 1 |

The autoclave is sealed and heated to 140° C. for 16 hours. After cooling the dyestuff suspension is worked up as in Example 2 and constitutes 1,4-di-(hydroxyethylamino)-5-hydroxy anthraquinone in good yield.

*Example 4*

An autoclave is charged with

|  | Parts |
|---|---|
| Quinizarin | 80 |
| Alcohol | 675 |
| Aqueous ammonia of 20% strength | 42.5 |
| Sodium carbonate | 1 |
| Manganese chloride | 1 |

The autoclave is sealed and heated to 110° C. for 12 hours. On cooling the product is filtered and worked up as described in Example 2 and constitutes 1-amino-4-hydroxy anthraquinone in good yield.

*Example 5*

An autoclave is charged with

|  | Parts |
|---|---|
| Quinizarin | 80 |
| Alcohol | 675 |
| 25% aqueous solution of monomethylamine | 50 |
| Sodium carbonate | 1 |
| Platinic chloride (as 100%) added in the form of a 5% aqueous solution | 1 |

The autoclave is sealed and heated to 120° C. for 6 hours.

The product is worked up as described in Example 2 and constitutes 1-hydroxy-4-methylamino anthraquinone in good yield.

Having described our invention what we desire to secure by Letters Patent is:—

1. Process for the replacement by a radical selected from the class consisting of an amino group and an aliphatically substituted amino group of an α-substituent in an anthraquinone nucleus of a compound containing an anthraquinone nucleus, said α-substituent being selected from the class consisting of hydroxyl, amino, and aliphatically and aromatically substituted amino groups, which comprises subjecting the anthraquinone compound to the action of a compound selected from the group consisting of ammonia and aliphatic amines in the presence of a compound of a metal capable of forming a complex nitrogenous compound with a nitrogenous base.

2. Process for the replacement by a radical selected from the class consisting of an amino group and an aliphatically substituted amino group of an α-substituent in an anthraquinone nucleus of a compound containing an anthraquinone nucleus, said α-substituent being a group selected from the class consisting of hydroxyl, amino, and aliphatically and aromatically substituted amino groups, which comprises subjecting the anthraquinone compound to the action of a compound selected from the group consisting of ammonia and aliphatic amines in the presence of a compound of a heavy metal, said heavy metal being one which forms a complex nitrogenous compound with a nitrogenous base.

3. Process for the replacement by a radical selected from the class consisting of an amino group and an aliphatically substituted amino group of at least one of the 1- and 4-substituents in an anthraquinone nucleus of a compound containing an anthraquinone nucleus, said 1- and 4- substituents being selected from the class consisting of hydroxyl, amino and aliphatically and aromatically substituted amino groups, which comprises subjecting the anthraquinone compound to the action of a compound selected from the group consisting of ammonia and aliphatic amines in the presence of a compound of a heavy metal, said heavy metal being one which forms a complex nitrogenous compound with a nitrogenous base.

4. Process for the replacement by a radical selected from the class consisting of an amino group and an aliphatically substituted amino group of an α-substituent in an anthraquinone nucleus of a compound containing an anthraquinone nucleus, said α-substituent being a group selected from the class consisting of hydroxyl, amino, and aliphatically and aromatically substituted amino groups, which comprises heating a mixture prepared with the anthraquinone compound, a compound selected from the group consisting of ammonia and aliphatic amines, and a heavy metal compound, the said heavy metal compound being one which reacts with a nitrogenous base to form a complex nitrogenous compound.

5. Process for the production of an anthraquinone compound having a substituent group selected from the class consisting of an α-amino group and an α-(aliphatically-substituted)-amino group, which comprises replacing at least one of the 1- and 4-hydroxyl groups in a 1,4-dihydroxy-anthraquinone by the action of a compound selected from the group consisting of ammonia and aliphatic amines in the presence of a compound of a metal capable of forming a complex nitrogenous compound with a nitrogenous base.

6. Process for the replacement by a radical selected from the class consisting of an amino group and an aliphatically substituted amino groups of at least one of the 1- and 4-hydroxyl groups in a 1,4-dihydroxy anthraquinone, which comprises subjecting the 1,4-dihydroxy anthraquinone to the action of a compound selected from the group consisting of ammonia and aliphatic amines in the presence of a compound of a heavy metal, the said heavy metal being one which forms a complex nitrogenous compound with a nitrogenous base.

7. Process for the replacement by a radical selected from the class consisting of an amino group and an aliphatically substituted amino group of at least one of the 1- and 4-hydroxyl groups in a 1,4-dihydroxy anthraquinone, which comprises subjecting the 1,4-dihydroxy anthraquinone to the action of a compound selected from the group consisting of ammonia and aliphatic amines in the presence of a compound of a non-ferrous metal having an atomic weight of from that of chromium to that of copper.

8. Process for the replacement by a radical selected from the class consisting of an amino group and an aliphatically substituted amino group of at least one of the 1-and 4-hydroxyl groups in a 1,4-dihydroxy anthraquinone, which comprises subjecting the 1,4-dihydroxy anthraquinone to the action of a compound selected from the group consisting of ammonia and aliphatic amines in the presence of a manganese compound.

9. Process for the replacement by a radical selected from the class consisting of an amino group and an aliphatically substituted amino group of at least one of the 1- and 4-hydroxyl groups in a 1,4-dihydroxy anthraquinone, which comprises subjecting the 1,4-dihydroxy anthraquinone to the action of a compound selected from the group consisting of ammonia and aliphatic amines in the presence of a copper compound.

10. Process for the replacement of at least one hydroxyl group of quinizarin by an aliphatically substituted amino group, which comprises heating quinizarin with an aliphatic amine in the presence of a compound of manganese.

11. Process for the replacement of at least one hydroxyl group of quinizarin by an aliphatically substituted amino group, which comprises heating quinizarin with an aliphatic amine in the presence of a compound of copper.

12. Process for the replacement of at least one hydroxyl group of quinizarin by a methylamino group, which comprises heating quinizarin with methylamine in the presence of a compound of manganese.

13. Process for the replacement of at least one hydroxyl group of quinizarin by a methylamino group, which comprises heating quinizarin with methylamine in the presence of a compound of copper.

14. Process for the replacement of at least one hydroxyl group of quinizarin by an amino group, which comprises heating quinizarin with ammonia in the presence of a compound of manganese.

15. Process for the replacement of at least one hydroxyl group of quinizarin by an aliphatically substituted amino group, which comprises heating a mixture prepared with quinizarin, an aliphatic amine and a manganese salt.

16. Process for the replacement of at least one hydroxyl group of quinizarin by an aliphatically substituted amino group, which comprises heating a mixture prepared with quinizarin, an aliphatic amine and a copper salt.

17. Process for the replacement by a radical selected from the class consisting of an amino group and an aliphatically substituted amino group of an α-substituent in an anthraquinone nucleus of a compound containing an anthraquinone nucleus, said α-substituent being selected from the class consisting of hydroxyl, amino, and aliphatically and aromatically substituted amino groups, which comprises subjecting the anthraquinone compound to the action, under super-atmospheric pressure, of a compound selected from the group consisting of ammonia and aliphatic amines in the presence of a compound of a metal capable of forming a complex nitrogenous compound with a nitrogenous base.

18. Process for the replacement by a radical selected from the class consisting of an amino group and an aliphatically substituted amino group of at least one of the 1- and 4-substituents in an anthraquinone nucleus of a compound containing an anthraquinone nucleus, said 1- and 4-substituents being selected from the class consisting of hydroxyl, amino and aliphatically and aromatically substituted amino groups, which comprises subjecting the anthraquinone compound to the action, under super-atmospheric pressure, of a compound selected from the group consisting of ammonia and aliphatic amines in the presence of a compound of a heavy metal, said heavy metal being one which forms a complex nitrogenous compound with a nitrogenous base.

19. Process for the production of an anthraquinone compound having a substituent group selected from the class consisting of an α-amino group and an α-(aliphatically-substituted)-amino group, which comprises replacing at least one of the 1- and 4-hydroxyl groups in a 1,4-dihydroxy-anthraquinone by the action, under super-atmospheric pressure, of a compound selected from the group consisting of ammonia and aliphatic amines in the presence of a compound of a metal capable of forming a complex nitrogenous compound with a nitrogenous base.

20. Process for the replacement by a radical selected from the class consisting of an amino group and an aliphatically substituted amino group of at least one of the 1- and 4-hydroxyl groups in a 1,4-dihydroxy anthraquinone, which comprises subjecting the 1,4-dihydroxy anthraquinone to the action, under super-atmospheric pressure, of a compound selected from the group consisting of ammonia and aliphatic amines in the presence of a compound of a non-ferrous metal having an atomic weight of from that of chromium to that of copper.

21. Process for the replacement by a radical selected from the class consisting of an amino group and an aliphatically substituted amino group of at least one of the 1- and 4-hydroxyl groups in a 1,4-dihydroxy anthraquinone, which comprises subjecting the 1,4-dihydroxy anthraquinone to the action, under super-atmospheric pressure, of a compound selected from the group consisting of ammonia and aliphatic amines in the presence of a manganese compound.

22. Process for the replacement by a radical selected from the class consisting of an amino group and an aliphatically substituted amino group of at least one of the 1- and 4-hydroxyl groups in a 1,4-dihydroxy anthraquinone, which comprises subjecting the 1,4-dihydroxy anthraquinone to the action, under super-atmospheric pressure, of a compound selected from the group consisting of ammonia and aliphatic amines in the presence of a copper compound.

GEOFFREY LORD.
GEORGE REEVES.